Dec. 20, 1938.  W. R. BECKMAN  2,140,503
INTERNAL COMBUSTION ENGINE
Filed May 18, 1936   5 Sheets-Sheet 1

Inventor:
William R. Beckman,
By Kent W. Worrell
Atty

Dec. 20, 1938.  W. R. BECKMAN  2,140,503
INTERNAL COMBUSTION ENGINE
Filed May 18, 1936  5 Sheets-Sheet 3

Inventor:
William R. Beckman,
By Kent W. Worrell
atty

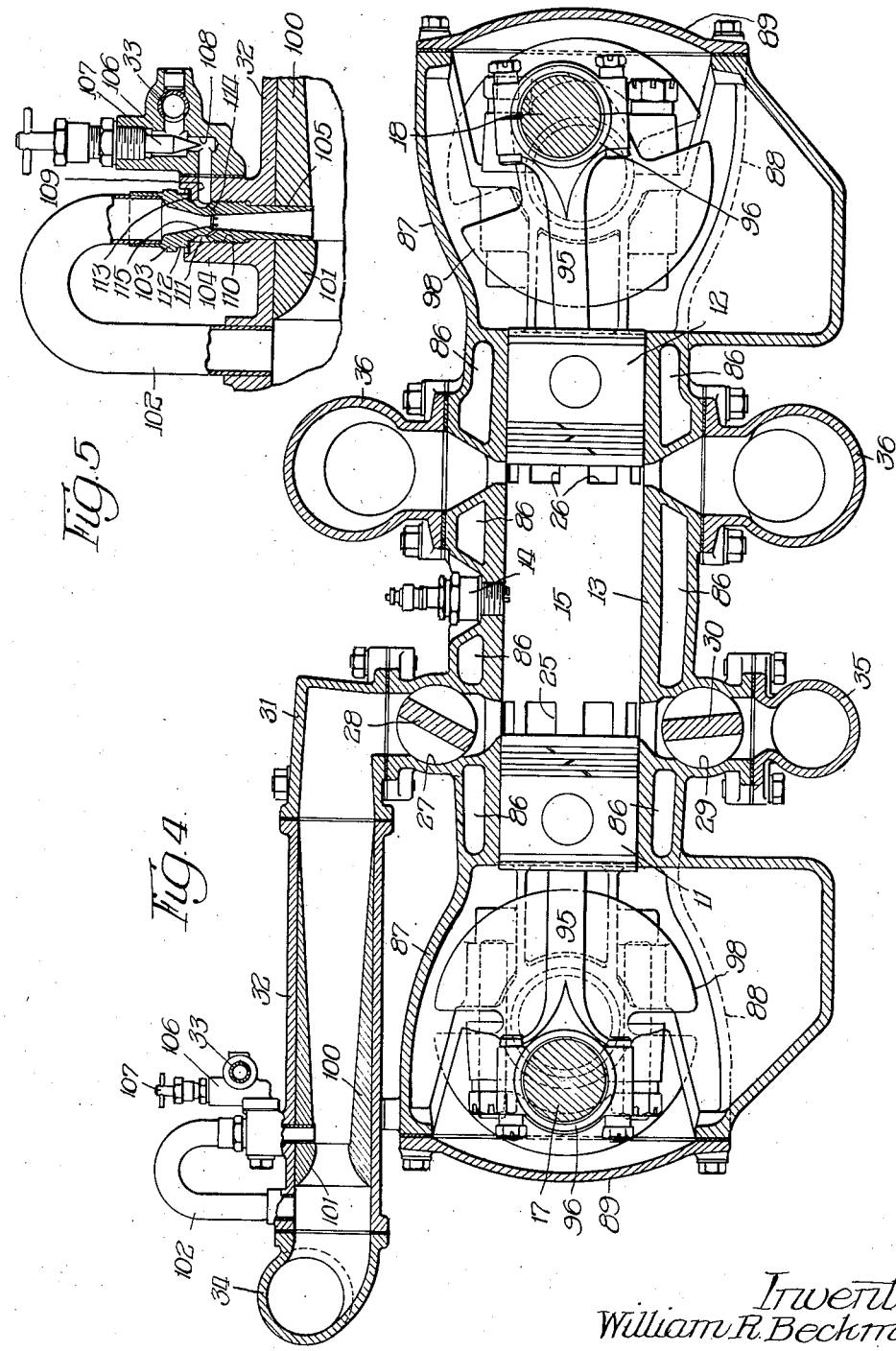

Dec. 20, 1938.      W. R. BECKMAN      2,140,503
INTERNAL COMBUSTION ENGINE
Filed May 18, 1936         5 Sheets-Sheet 5
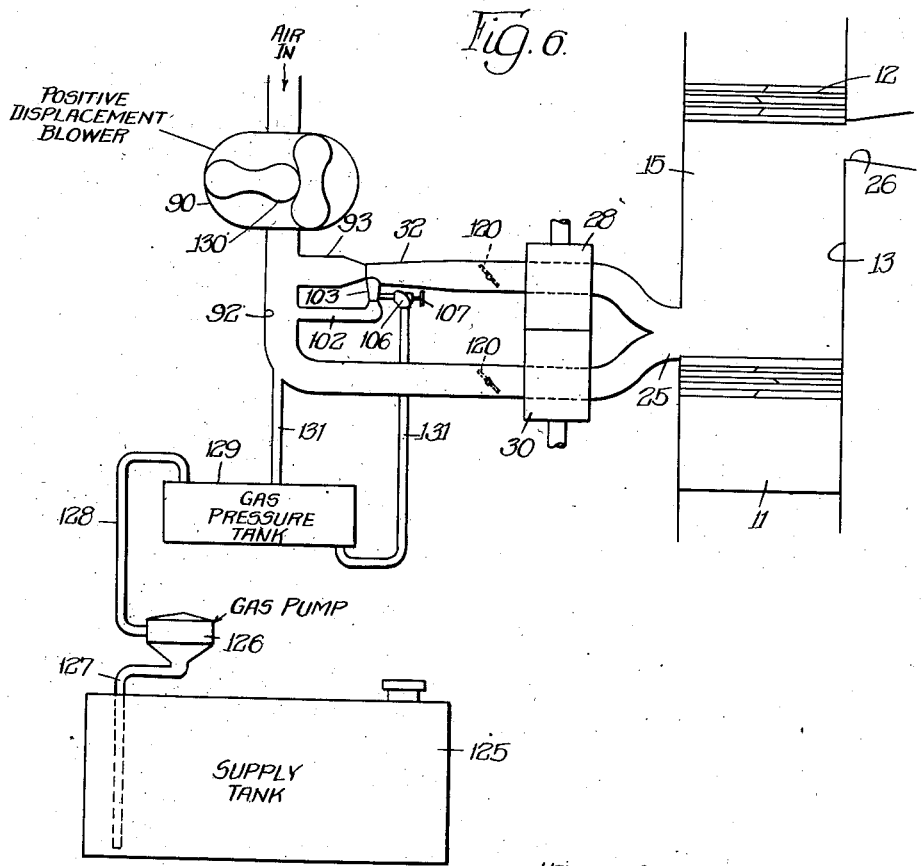
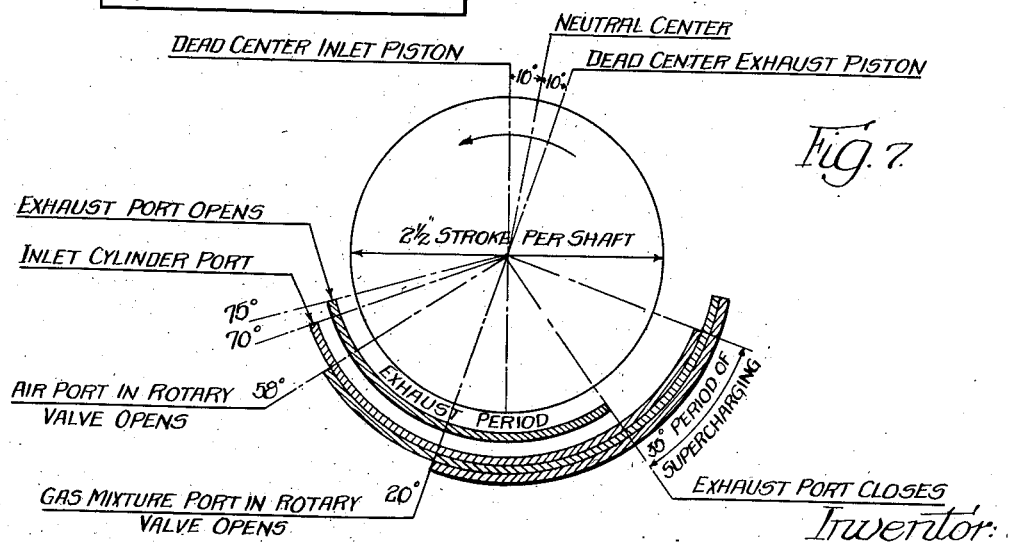
Inventor:
William R. Beckman,
By Kent W. Worrell
atty.

Patented Dec. 20, 1938

2,140,503

UNITED STATES PATENT OFFICE 2,140,503

INTERNAL COMBUSTION ENGINE

William R. Beckman, Barrington, Ill., assignor to Nels Shoan, Chicago, Ill.

Application May 18, 1936, Serial No. 80,365

18 Claims. (Cl. 123—51)

This invention relates in general to a supercharged internal combustion engine and is more particularly described as a two-cycle air and fuel injection engine of the Junkers type in which there are two pistons movable in opposite ends of a common cylinder having a combustion chamber between them, a scavenging air inlet adjacent one end and an exhaust outlet adjacent the other end.

An important object of the invention is in the provision of a fuel injection supercharged engine of the two-cycle type having double opposed pistons and power shafts for producing a compact arrangement of parts resulting in a powerful engine occupying minimum space.

A further object of the invention is in the provision of an air and fuel injection system for an engine of this type in which fuel is finely divided by a double atomization principle providing a more volatile charge.

A further object of the invention is in the provision of an engine having an induction system which permits a two-cycle engine to be supercharged without the use of poppet valves.

A further object of the invention is in the provision of a supercharged engine in which the combustion chamber is first scavenged with air before the admission of a fuel charge resulting in a more clean explosive mixture.

A still further object of the invention is in the provision of an air and fuel injection system which permits the fuel to be automatically varied in amount according to the motor speed without mechanical means to control and inject the fuel.

A further object of the invention is in the provision of an engine having opposed pistons with parallel crank shafts and rotary valves to secure a longer expansion stroke for obtaining greater horse power per cubic inch displacement, higher fuel economy, a better balanced engine at less weight and lower speeds with a better balanced engine than possible with any other present type of internal combustion engine.

Other objects of the invention will hereafter appear, and the accompanying drawings illustrate a preferred embodiment of the invention, in which Fig. 1 is a plan view with parts shown in section, of an engine embodying the principles of this invention;

Fig. 4 is a sectional view taken on the center line of one of the cylinders, and showing a sectional view of the air and fuel injector;

Fig. 5 is a detail view of the fuel injector;

Fig. 6 is a diagrammatic view illustrating the operation of the fuel injection system as applied to a super-charged engine of this type; and Fig. 7 is a timing diagram illustrating the relation of the rotary valve and cylinder ports to the rotation of the crank shaft.

Figure 1:
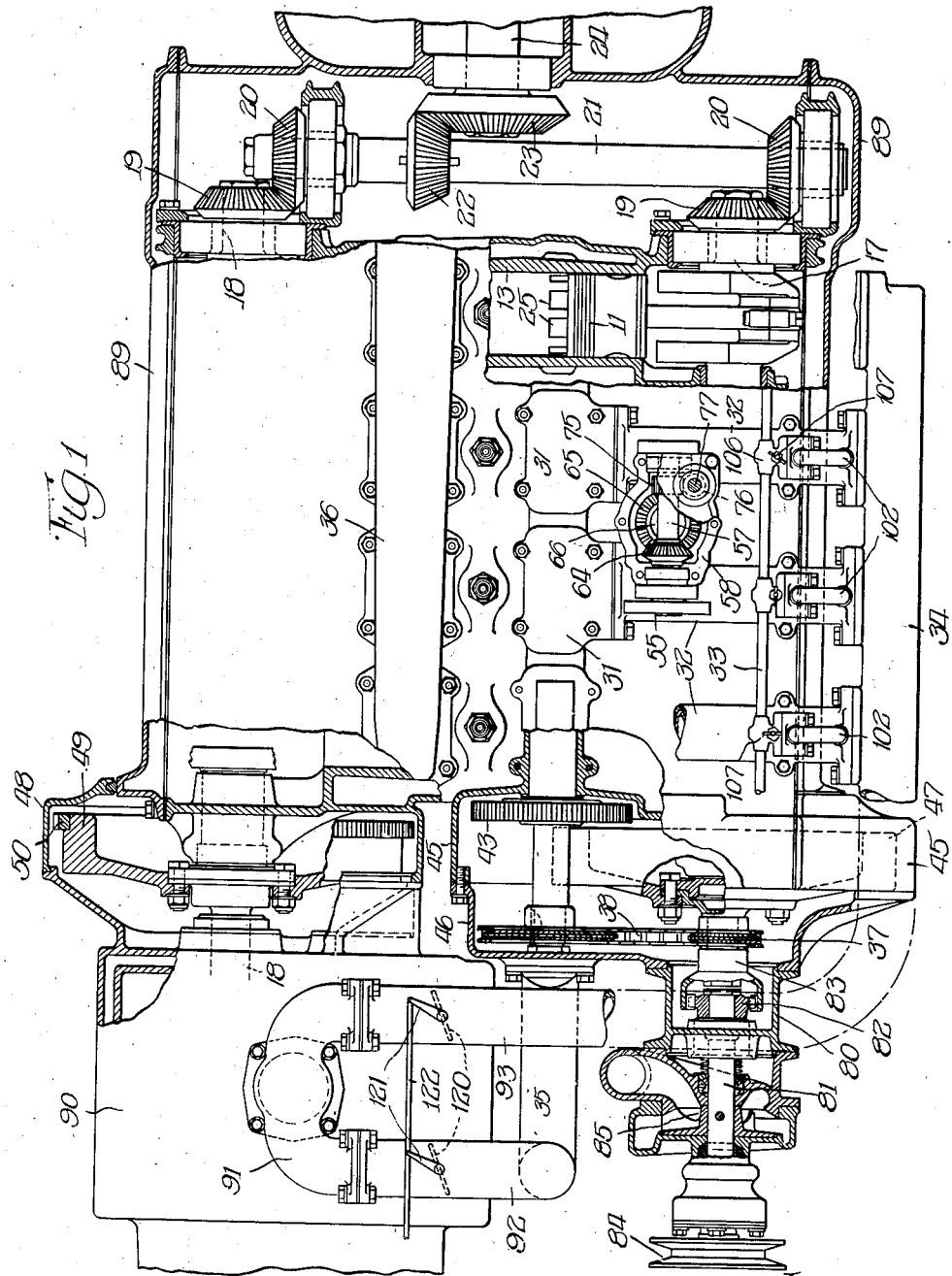

Although an engine having two opposed pistons operating in a common cylinder barrel forming an explosion chamber between them is not new of itself, this structure as used with a two-cycle engine of the uniflow type in which air and fuel are injected under pressure to provide a supercharger contains many features of novelty and the structure, together with the system for carrying out the principles, constitute the novelty in this case.

Referring now more particularly to the drawings this invention is described as applied to a two-cycle, four cylinder type of engine supercharged by a positive displacement blower to furnish air under about two atmospheres pressure or approximately thirty pounds.

As shown more clearly by Fig. 4, the engine is of the Junkers type having two opposite pistons 11 and 12 operating at the ends of a common cylinder 13 with a spark plug 14 to cause an explosion between the pistons in an explosion chamber 15. The pistons are connected by piston rods to opposite crank shafts 17 and 18 and the driving ends of the crank shafts have bevel gears 19 (Fig. 1) secured thereto and meshing with corresponding bevel gears 20 at the ends of a countershaft 21. Secured intermediate the ends of the counter-shaft is a bevel gear 22 meshing with a bevel gear 23 at the end of a drive shaft 24 by which the power of the engine is transmitted.

Near one end of each cylinder 13 are inlet ports 25 located to be uncovered by one of the pistons 11 at the outer end of its stroke and adjacent the other end of each cylinder are discharge ports 26 located to be uncovered by the other piston 12 at the end of its stroke so that the movement of air and fuel through the cylinder is always in the same direction without reversal, thereby resulting in better scavenging and increased power.

Extending transversely above the cylinders is a tubular valve casing 27 in which a rotary valve 28 is mounted having separately timed passages for each of the cylinders. Extending transversely at the bottom of the cylinders is a tubular valve casing 29 in which a similar rotary valve 30 is rotatable.

Connected to the valve casing opposite the passages in the rotary valve 28 for each cylinder 13 is an angle fitting 31 to which a fuel pipe 32 is connected for receiving fuel from a common supply pipe 33 and air from a common supply pipe 34 as hereafter set forth.

Connected to the valve casings 29 at the bottom of the cylinders is an air supply pipe 35 and the timing of the valves 28 and 30 is such that when the exhaust ports 25 are first uncovered a charge of scavenging air under pressure from a blower is first admitted through the ports 25 to drive the burnt gases from the exhaust ports 26.

Connected with the exhaust ports at the top and bottom of the cylinders are exhaust manifolds 36 through which the burned or exhaust gases are discharged in any well known manner.

Figure 3:
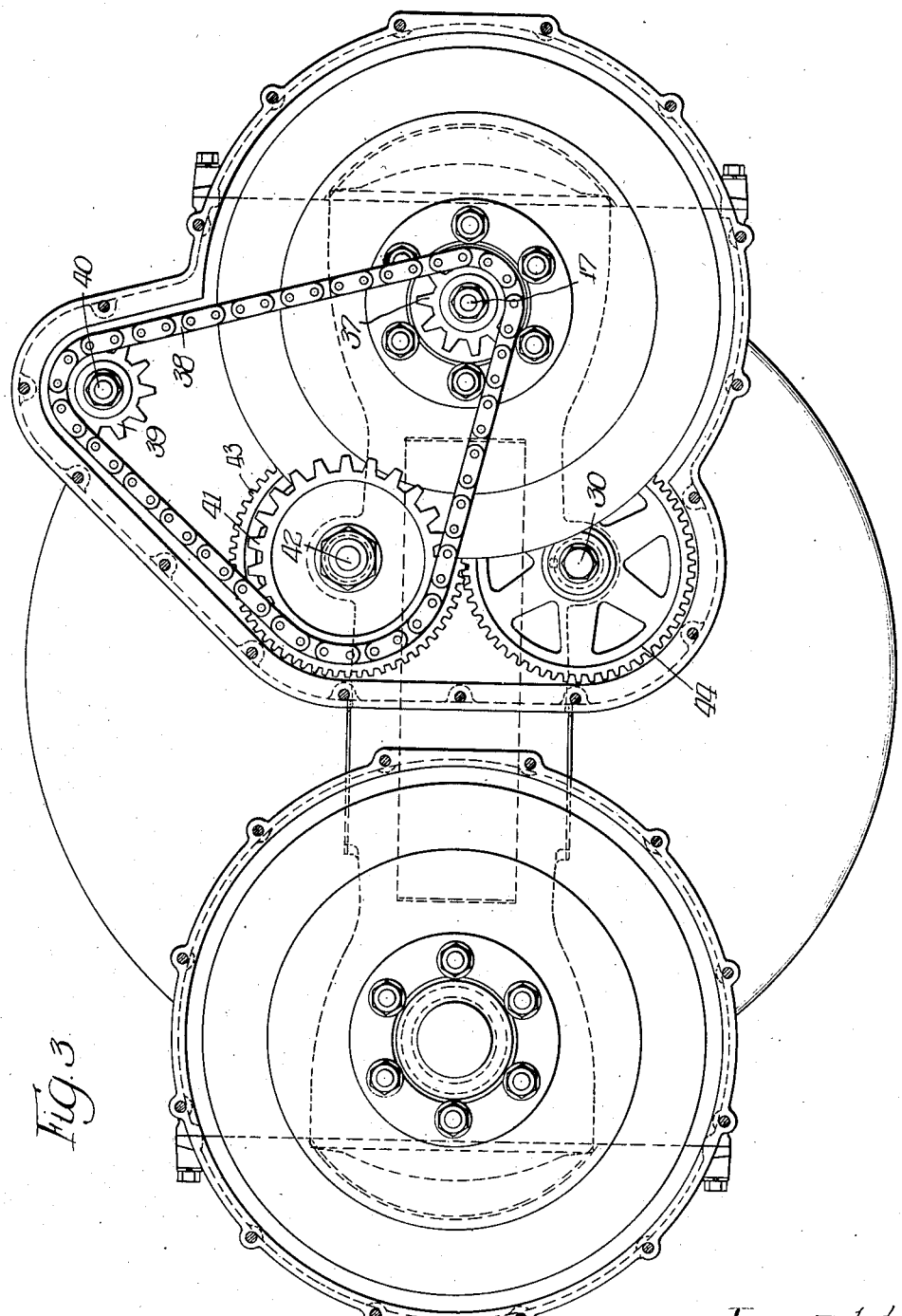
Fig. 3 is a front view of the engine with the supercharger and one cover plate removed.

For actuating the rotary valves a sprocket 37 (Fig. 3) is secured to the end of one of the crank shafts 17 for engaging an endless driving chain 38 which also engages a sprocket 39 mounted on a shaft 40 and also a sprocket 41 mounted on a shaft 42. This shaft 42 is secured to a gear 43 which is secured to the end of one of the rotary valves 28 and meshes with a corresponding gear 44 secured to the other rotary valve 30. Thus the rotary valves are connected directly to the crank shaft and are commonly driven at one-half of the engine or cam shaft speed.

The driving gear for the rotary valves is enclosed by a casing 45 having a removable cover plate 46 which also encloses a flywheel 47 mounted on the crank shaft 17, and at the opposite side of the front is a casing 48 for enclosing a flywheel 49 on the other crank shaft 18. This flywheel carries an external ring gear 50 for the engagement of a starter pinion (not shown) as commonly operated by a small electric motor for starting internal combustion engines of this type.

To adjust the tension of the sprocket chain 38, the sprocket 39 and its shaft 40 are mounted in a bearing comprising a sleeve 51 which has an outer surface eccentric to its inner bore mounted in an opening 52 in the casing 45 and in a corresponding bracket extension 53 of the casing. The sleeve is preferably provided with a projection 52a at one end in the form of a flattened head or nut which is accesible from the outside of the casing 45 for turning the sleeve in its bearing and thus adjusting the tension of the driving chain 38.

Connected to the shaft 40 by flexible joints 54, 55 and an intermediate stub shaft 56, is a driving shaft 57, the joints permitting the eccentric variation of the sleeve 51 without affecting the driving engagement with the shaft 57. This shaft 57 extends through a split bearing box having a lower portion 58 mounted upon and extending upwardly from the machine frame, and an upper cap portion 59 for closing the box. The other end of the shaft is connected by a flexible joint 60 with the shaft 61 of an electric generator 62 also supported from the machine frame by a saddle casting 63.

Mounted upon the shaft 57 within the bearing box (Fig. 1) is a bevel gear 64 engaging a corresponding bevel gear 65 at the upper end of a vertical shaft 66 which extends downwardly between the central cylinders to an oil pump 67 (Fig. 2) set in the bottom of the engine crank case 68. The pump is mounted in a compartment formed by a partition 69 in a downwardly inclined central portion of the crank case having side openings 70 through which oil will drain to the bottom of the pump. At the bottom of the crank case is a pump casing 71 attached from the outside of the crank case by fastening bolts 72 so that the pump is easily accessible for cleaning and repair. Oil supply pipes 73 are connected to the pump through the partition 69 for furnishing oil under pressure to the various motor bearings and parts.

Also connected to the driving shaft 57 is a pinion 75 (Fig. 1) which meshes with a gear 76 on a cam shaft 77 for an ignition timer 78 carried by the bearing box cap 59 where the ignition parts are easily accessible for adjustment, renewal and repair.

Mounted in a bearing bracket 80 secured to the front of cover plate 46 is a driving shaft 81 removably connected to the crank shaft 17 by a sprocket or gear 82 at the end of shaft 81 and an internally toothed socket 83 at the end of the crank shaft with which the teeth of the sprocket are meshed. This shaft 81 carries a grooved pulley 84 at its outer end for driving a radiator cooling fan belt and intermediate its ends is a water circulating pump 85 of the centrifugal type, these parts being ordinarily employed in connection with a water cooled engine having a water cooling radiator and a pump for circulating the cooling water from the engine through the radiator and back to the water jacket of the engine, the cooling portions of which are indicated by the openings 86 surrounding the cylinder in Fig. 4. As these features are incidental to the successful operation of an internal combustion engine of the water cooled type, the radiator, cooling fan and water connections are omitted.

By reference to Figure 4 it will be seen that the crank shafts 17 and 18 are suitably mounted at the ends of the cylinders and they are also enclosed by upper and lower end extensions 87 and 88 of the cylinders and removable cover plates 89 at the ends removably bolted in place and thus completely enclosing the crank shafts and their connections with the pistons 11 and 12, but making them easily accessible for adjustment and repair.

Each piston is connected to its crank shaft by a piston rod 95 having a bearing bloc 96 at the outer end for attaching it to the crank shaft and the bearing bloc and the piston for any cylinder being accessible by the removal of the corresponding end plate 89. Counter-balancing weights 98 are also secured to or carried by the crank shafts and are enclosed by the extensions at the ends of the cylinders.

Figure 2:
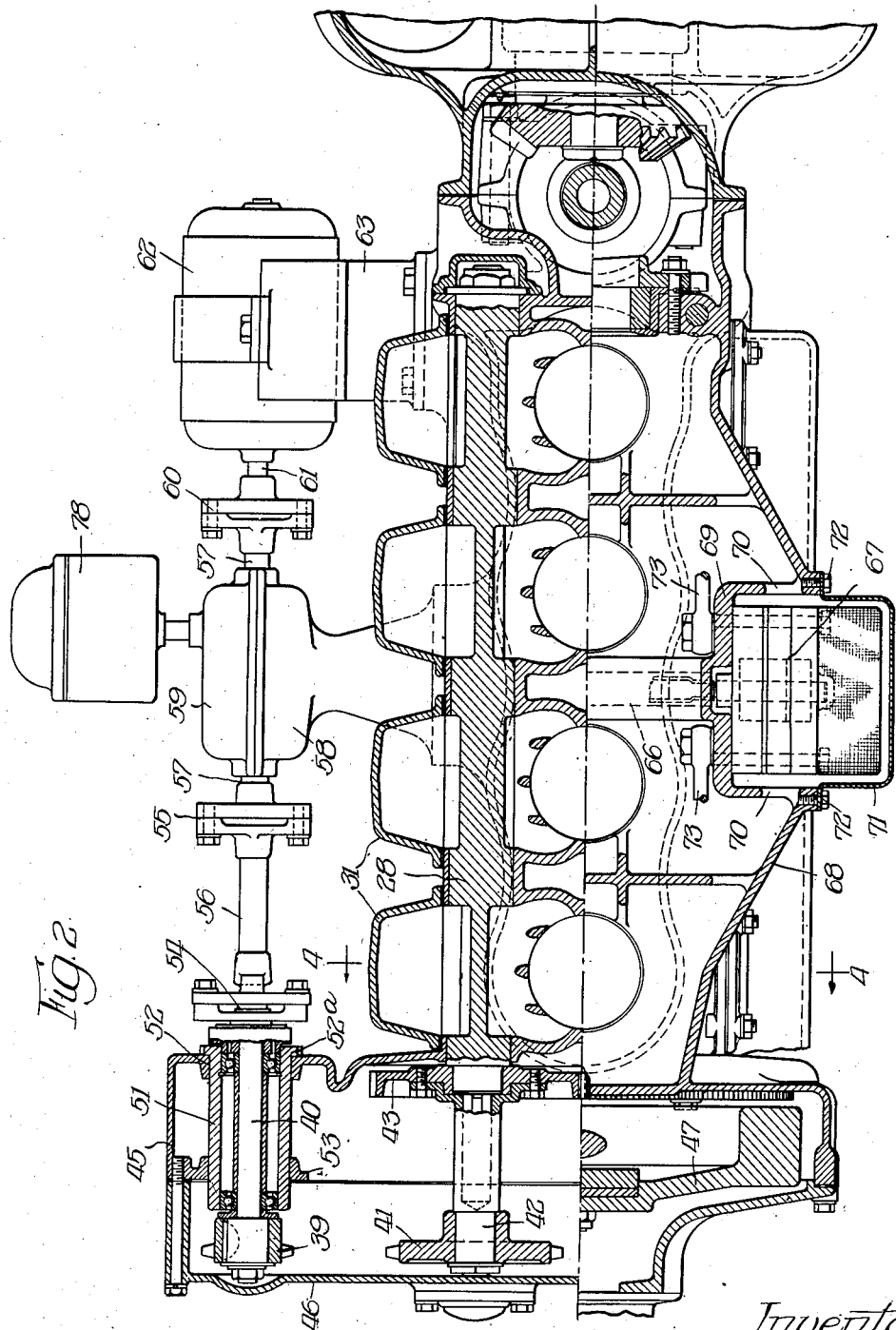
Fig. 2 is a sectional elevation with part of the section taken through the center line of the rotary valve.

Each of the cylinders has a separate fuel injection device contained in and carried by the pipe 32 and receiving fuel from a common supply pipe 33, and air under pressure from the supply pipe 34. A positive displacement air pump or blower for supplying air is mounted at one end of the engine and is shown in Fig. 1 at the front end of the crank shaft 18 as contained in a casing 90, the operating parts of which are driven by the crank shaft 18 or an extension thereof. Extending from the casing 90 is a fitting 91 to which pipes 92 and 93 are connected. The pipe 92 is connected to the supply pipe 35 through which scavenging air is furnished to the cylinders through the rotary valve 30. The other pipe 93 is connected to the manifold pipe 34 through which air is supplied to the fuel injector pipes 32.

A fuel injector is supplied for each cylinder which is separately adjustable so that the greatest fuel economy and efficiency can be obtained.

Each fuel injector causes a double atomization of the fuel by the Venturi principle for insuring first a thorough breaking up of the fuel and then a thorough mixture of the broken up fuel with the air. This is accomplished by providing a Venturi member 100 having its reduced or restricted extremity 101 adjacent the air inlet end of the tube 32 and flaring outwardly at the opposite end. Connected through the pipe 32 in advance of the restriction is a pressure pipe 102 having a smaller Venturi fitting 103 projecting through a hollow projection 104 at the side of the pipe 32 and through an opening 105 just beyond the restriction of the larger Venturi member 100. This pipe being connected at the pressure side of the member 100 and having its discharge opposite the restriction of the Venturi member 100 causes a pressure by-pass for the air supplied under pressure through the tube 102 and through the fuel Venturi member 103.

Connected to the projection 104 is a needle valve fitting 106 through which the fuel pipe 33 extends for supplying fuel thereto and into which a needle valve 107 is threaded for controlling a fuel passage 108 leading from the fuel supply pipe and communicating with a passage 109 leading to the interior of the hollow projection 104. The Venturi fitting 103 has a threaded portion 110 insertable in the hollow projection 104, an annular groove 111 next to the threads communicating with the passage 109 and a shoulder 112 beyond the groove abutting the outer end of the projection 104 with a washer 113 interposed for making a tight joint when the threaded portion is tightly inserted. A number of holes 114 extend through the shell of the fitting from the groove 111 to the relief side of its restricted portion 115 so that the pressure applied to the fitting 103 has a Venturi action in drawing fuel from the passages 109 and 108 as admitted from the fuel pipe by the needle valve 107.

This action thoroughly atomizes the fuel so that when it passes from the primary atomizer into the secondary or larger venturi within the pipe 32 a thorough mixture and atomization of the fuel is obtained which then passes under pressure to the engine cylinder. By this thorough mixture of air and fuel it is possible to use a lower grade fuel such as fuel oil rather than gasoline.

For controlling the speed, valves 120 may be located in the air supply pipes 92 and 93 (Fig. 1) or in the fittings 31 and operated independently by external attached arms 121 or the arms may be connected for joint operation by a bar 122.

In this engine it will be noted that the piston 12 at the exhaust end of the cylinder is some degrees in advance of its outer dead-center position, which means that the exhaust port opens slightly in advance of the inlet port. The sequence of operation will be understood more readily from the timing diagram of Fig. 7 in which the exhaust port is shown to open or to be uncovered by its piston a few degrees in advance of the opening of the inlet cylinder port. The next operation is for the opening of the air port for the rotary valve 30 which admits clean air under pressure to scavenge the cylinder for approximately thirty-eight degrees before the fuel mixture is admitted to the cylinder through the ports 25 by the rotary valve 28. The gas and air ports are now open for a period before the exhaust valves are closed by the piston 12 after which there is a period of approximately thirty-five degrees in which the air and gas mixture ports are open for supercharging.

The explosive charge thus admitted and forced into the cylinder is then compressed and fired in the usual manner.

A schematic arrangement of the operation may be best understood by reference to Fig. 6 in which a main fuel supply tank 125 has a fuel pump 126 for withdrawing fuel therefrom through a pipe 127 and discharging it through a pipe 128 to a closed fuel tank 129. The pump 126 may be operated either separately or by the engine itself.

Air under suitable pressure is supplied by a positive displacement blower 130 mounted in the casing 90 and discharging therefrom through air pipes 92 and 93 to the engine inlet 25; the air inlet from the pipe 92 being controlled by the speed control valve 120 and the rotary valve 30 and the air through the fuel injector and the fuel therefrom being controlled by a valve speed control valve 120 and the rotary valve 28. The air pressure of the system is also maintained in fuel tank 129 by a pressure balancing pipe 131 extending from one of the air pipes 92 to the top of the tank 129 and the fuel supply pipe 33 leading from the bottom of this tank to the needle valve fitting 106 where it is admitted into the primary injector 103 and thence into the secondary Venturi member in the pipe 32.

Thus an efficient engine is produced utilizing a low pressure, high velocity fuel jet injector of the two-stage type in which scavenging air and fuel is admitted through the same ports and passes always in the same direction through the cylinder to the exhaust port and without the necessity of any mechanical means for controlling and injecting the fuel. In this exemplification the engine is shown with four cylinders but the action and result is similar to that of an eight cylinder engine. Furthermore to increase the power of the engine it is only necessary to add additional cylinders or blocs of cylinders and the addition of cylinders does not increase the size of the engine in heighth but only in length, using the same engine accessories at the front and rear. With this double opposed piston type of engine a very low overhead is required and as the horse power per unit volume of the engine is very high in comparison with Diesel and other types of internal combustion engines, this engine is particularly adapted for trucks, power plants of stream-line trains, boats, and other installations where a compact engine of high power is desired.

Although this supercharged engine has been described in connection with a two-cycle engine, the invention may also be applied to a four-cycle engine without departing from the spirit and scope of the invention.

This invention is regarded as an improvement upon the structure shown in the John F. Sandell Patent No. 1,391,981 of September 27, 1921, and is a practical exemplification of air scavenging as applied to a two-cycle engine in which compressed air is led in a double passage to the same cylinder inlets, one of the passages carrying fuel which is injected by the air pressure and admitting it to the cylinder after it is scavenged by the clear air.

I claim:

1. In an internal combustion engine, a cylinder, means for compressing air for said cylinder, a double passage including a bypass for one of them from said means to the same ports of the cylinder, means for utilizing air pressure from said means for injecting fuel into one passage and said bypass to said cylinder, and valve means operated by the engine for admitting air from one passage to the cylinder before fuel is admitted thereto from the other passage to the same cylinder ports.

2. In an internal combustion engine, a cylinder having inlet ports at one end, means for compressing air for said cylinder, a double passage including a bypass for one passage from said means to the cylinder, means for injecting fuel from said compressed air means into one passage and the bypass, and valve means for admitting air from the other passage to the inlet ports before fuel is admitted to the cylinder from the other passage and its bypass and through the same cylinder ports.

3. In an internal combustion engine, a cylinder having admission ports at one end and exhaust ports at the other, means forming a double passage for compressed air to the inlet ports, fuel injection means including a bypass utilizing air from said compressed air means for injecting fuel into one passage, and valve means for controlling the passages to admit air and fuel to the cylinder through the same cylinder ports, the air being admitted first, and for discharging the products of combustion at the same time.

4. In an internal combustion engine, a cylinder, means for compressing air for said cylinder, a double passage from said means to common ports of said cylinder, means including a bypass for utilizing air pressure from said means for injecting fuel into one passage for said cylinder, engine operated valve means for admitting air from one passage and its bypass to the cylinder before fuel as admitted thereto from the other passage, and throttle valve means in the said passages for controlling the operation of the engine.

5. In an internal combustion engine, a cylinder, means for compressing air for said cylinder, a double passage from said means to the cylinder, fuel injection means including a bypass and an injector in said bypass actuated by air from said compressed air means for injecting fuel into one of the passages, and valve means in the passages and between the fuel injector and the cylinder for controlling the air and fuel admitted to the cylinder.

6. In an internal combustion engine, a cylinder, means for compressing air from said cylinder, a double passage from said means to the cylinder, and means for injecting fuel into one passage for admission to said cylinder, said means including a fuel receptacle and means including a bypass and a secondary fuel injector therein for placing the fuel receptacle under air pressure from the compressed air means to assist in injecting fuel into said passage.

7. In an internal combustion engine, a cylinder, means for compressing air for said cylinder, a double passage from said means to said cylinder, a fuel injector for one passage, a bypass for one passage, a fuel injector in said bypass, a fuel injecting mixer connecting the bypass to the passage, and valve means operated by the engine for admitting air and fuel from the passages to the cylinder, the air being admitted from one passage to the cylinder before the fuel is admitted thereto from the other passage.

8. In an internal combustion engine, a cylinder having admission ports at one end and discharge ports at the other end, means for compressing air for said cylinder, a double passage from said means to the admission ports of the cylinder, separate pistons movable in the cylinder to control the admission and discharge ports, means for injecting fuel under pressure from said air compressor into one passage to said cylinder, a bypass for the fuel passage with a secondary injector therein, and valve means operated by the engine for controlling the air and fuel passages operative to admit air from one passage to the cylinder in advance of the admission of fuel from the other passage to the cylinder so that the air and fuel will pass continuously through the cylinder from the inlet to the exhaust passages and will be discharged from the exhaust passages by the air before fuel is admitted to the cylinder.

9. In an internal combustion engine, a cylinder, means for compressing air for said cylinder, a passage from said means to said cylinder, a bypass for said passage, a fuel injector in the bypass, a second injector connecting the bypass with the passage for additionally breaking up the fuel, and valve means for admitting fuel from the passage to the engine cylinder.

10. In an internal combustion engine, a cylinder, means for compressing air for said cylinder, a passage from said means to the cylinder, a bypass from the means to the passage, a fuel injector operated by pressure from said compressed air means for injecting fuel into the bypass, a secondary injector for admitting fuel from the bypass to the passage, an engine operated valve for controlling the admission of fuel from the passage to the cylinder, and a throttle valve between the injector and the other valve for also controlling the operation of the engine.

11. In an internal combustion engine, a cylinder, means for compressing air for said cylinder, a passage from said means to the cylinder, a bypass from the means to the passage, means forming a two-stage air pressure fuel injector comprising a fuel injector in the bypass and a fuel injector connecting the bypass with the passage for vaporizing fuel admitted by the passage to the cylinder.

12. In an internal combustion engine, a cylinder, means for compressing air for said engine cylinder, a passage from said means to the cylinder, a two-stage fuel injector comprising a bypass from said means to the passage, a Venturi tube injector at the end of the bypass extending into the passage and a Venturi tube in the passage having the inlet from the other Venturi tube at the low pressure side of its Venturi tube to produce a thorough mixture of fuel forced by air pressure through the passage to the cylinder.

13. In an internal combustion engine, a cylinder, means for compressing air for said cylinder, a passage from said means to said cylinder, a bypass from said means to the passage, a two-stage injector for fuel comprising a Venturi tube section in said passage, a Venturi tube at the end of the bypass terminating at the relief side of the Venturi section in the passage, and means for feeding fuel to the relief side of the Venturi tube of the by-pass.

14. In an internal combustion engine, a plurality of cylinders, means comprising a pump for compressing air for said cylinders, a double passage from said means to each of said cylinders, means comprising a two-stage injector for utilizing air pressure from said pump means for injecting fuel from one passage to each cylinder and including a common fuel supply pipe and a separate control valve for admitting the fuel to each of the said two-stage fuel devices, and valve means operated by the engine for admitting air from one passage to the cylinder before fuel is admitted thereto from the other passage.

15. In an internal combustion engine, a plurality of cylinders each having inlet and exhaust ports and a piston movable therein, means for compressing air for the cylinders, a double passage from said means to the inlet ports of each cylinder, means for utilizing air pressure from said compressed air means for injecting fuel into one passage to said cylinder, rotary valves at opposite sides of the cylinders, one controlling the air admission to the cylinders from the air passages thereof and the other valve controlling the fuel admitted from the other passages to the same inlets of all the cylinders, the valves being timed to admit air to the cylinders before fuel is admitted thereto, the discharge ports in each cylinder controlled by the piston therein to open and close before the inlet ports are opened and closed by the said rotary valves.

16. In an internal combustion engine, a cylinder having inlet and exhaust ports, a piston movable in the cylinder to cover and uncover the inlet ports, means for compressing air for the cylinder, a passage from said means to the inlet port of the cylinder, means for injecting fuel into the passage, valve means operated by the engine for admitting fuel through the ports at one end of the cylinder and discharging it through the exhaust ports at the other end of the cylinder in a uniflow direction, and a secondary piston at the exhaust end of the cylinder timed to open and close the exhaust ports before the inlet ports are opened and closed, giving a supercharging period after the exhaust ports are closed and before the inlet ports are closed.

17. In an internal combustion engine, a cylinder having inlet and exhaust ports and a piston movable to cover and uncover the inlet ports, means for compressing air for the cylinder, a double passage from said means to the inlet ports of the cylinder, means for utilizing air pressure from said means for injecting fuel into one passage to said cylinder inlet port, valve means operated by the engine and timed for admitting air from one passage to the cylinder before fuel is admitted thereto from the other passage, a secondary piston at the exhaust end of the cylinder for the exhaust ports, and means for timing the operation of the pistons so that the exhaust ports are opened before air and fuel is admitted, the exhaust ports being closed by the piston therefor before the inlet ports are closed to provide a supercharging period for air and fuel under pressure from said compressed air means from the time the exhaust ports are closed until the inlet ports are closed.

18. In an internal combustion engine, a plurality of horizontal cylinders having inlet and outlet ports, a piston for each cylinder movable to cover and uncover the inlet ports, means for compressing air for the cylinders, a double passage from said means to each cylinder, means for utilizing pressure from said air compressing means to inject fuel into one passage to each cylinder, valve means operated by the engine for separately admitting air from one passage to each of the cylinders before fuel is admitted thereto from the fuel passages, a common extension from the top and bottom of the cylinders to extend over the crank shaft at the ends of the cylinders, and removable end plates for the said extensions by means of which the crank shafts are entirely enclosed.

WILLIAM R. BECKMAN.